(12) United States Patent
Sayama et al.

(10) Patent No.: US 6,244,237 B1
(45) Date of Patent: Jun. 12, 2001

(54) BALANCER DEVICE FOR A FOUR-CYCLE V-TYPE EIGHT CYLINDER ENGINE

(75) Inventors: Takehiko Sayama; Naoki Takahara; Yasuhiro Yamasaki, all of Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/452,466

(22) Filed: Dec. 2, 1999

(30) Foreign Application Priority Data

Dec. 4, 1998 (JP) .................................................. 10-345160
Dec. 28, 1998 (JP) .................................................. 10-372919

(51) Int. Cl.[7] .................................................. F16F 15/26
(52) U.S. Cl. .................................................. 123/192.2
(58) Field of Search .................................. 123/192.2, 195 H, 123/196 R; 74/603, 604

(56) References Cited

U.S. PATENT DOCUMENTS 4,028,963 * 6/1977 Nakamura et al. ................ 123/192.2
4,856,486 * 8/1989 Mori et al. ............................ 123/572
4,993,378 * 2/1991 Sakurahara et al. .............. 123/196 R
5,884,599 * 3/1999 Shiozaki et al. .................. 123/192.2

FOREIGN PATENT DOCUMENTS

3625246 * 2/1988 (DE) .
8-193643 7/1996 (JP) .

* cited by examiner

Primary Examiner—Willis R. Wolfe
Assistant Examiner—Hyder Ali
(74) Attorney, Agent, or Firm—Armstrong, Westerman, Hattori, McLeland & Naughton, LLP

(57) ABSTRACT

A balancer device for a four-cycle V-type eight cylinder engine having a bank included angle of 90 degrees, including: a crankshaft, a cylinder block having an upper block and a lower block divided from a horizontal plane passing through a center of the crankshaft and balancer shafts. Each of the upper and lower blocks defines a bearing hole in such a manner that an axis thereof extends in parallel with the crankshaft, the bearing holes of the upper and lower blocks being located at positions symmetrical with respect to the dividing plane; and balancer shafts supported to the bearing holes.

37 Claims, 5 Drawing Sheets

BALANCER DEVICE FOR A FOUR-CYCLE V-TYPE EIGHT CYLINDER ENGINE

BACKGROUND OF THE INVENTION

1. Field of the Invention

The present invention relates to a balancer device for canceling a vibromotive force of a four-cycle V-type eight cylinder engine, and further relates to an oil return passage for an engine and more particularly to a passage for returning oil from a cylinder head to an oil pan.

2. Description of the Related Art

When a plane crank in which centers of all crank pin shafts are placed on the same plane is adopted in a four-cycle V-type eight cylinder engine having an included bank angle of 90 degrees, both banks operate at a cycle of 180 degrees and intake and exhaust strokes happen in an alternate fashion. According to this construction, intervals between intake and exhaust timings become equal and there is no risk of generation of exhaust interference, this being thereby advantageous in obtaining a high output.

On the contrary, in the case of a V-type eight cylinder engine adopting the plane crank, a secondary imbalance is generated by virtue of the inertia force of a reciprocating mass, and the direction of the inertia force when the engine is viewed as a whole when this happens is similar to a condition in which cylinders of a in-line four cylinder engine are placed horizontally (a horizontal component of the inertia force remains). Therefore, this imbalance can be compensated for by adopting the secondary balancer theory of the conventional in-line four cylinder engine and rotating in opposite directions two balancer shafts disposed on a plane in parallel with a plane bisecting the bank included angle of the engine and passing through a center of a crankshaft thereof (Japanese Unexamined Patent Publication No. HEI 8-193643).

However, in trying to provide balancer shafts on a V-type engine, it is inevitable that the construction of the engine becomes complicated, and since the balancer shaft itself generates an imbalance, a high degree of supporting rigidity is required in order to obtain an expected vibration damping function. Namely, provision of balancer shafts inevitably causes an enlargement of the engine and reduces the productivity thereof.

Further, conventionally, oil returning from a cylinder head is constructed so as to flow into a crank chamber through a passage provided in the cylinder block to be allowed to eventually fall in an oil pan defined below the crank chamber (refer to the Japanese Unexamined Patent Publication No. HEI 2-245413).

On the other hand, the Japanese Unexamined Utility Model Publication No. SHO 64-34449 discloses an engine comprising a cylinder block comprising in turn an upper block, a lower block and an oil pan adapted to be joined to a lower surface of the lower block, the upper and lower blocks being divided from a horizontal plane passing through a center of a crankshaft, wherein a baffle is formed integrally with the lower block for suppressing the generation of a disturbance in the surface of oil in the oil pan by virtue of a wind pressure generated by counterweights provided on the crankshaft or the movement of the oil surface by virtue of a change in the vehicle posture.

According to the aforesaid conventional constructions, since return oil interferes with a balancer shaft or the crank chamber and the oil pan are partitioned by the baffle, oil returning from a cylinder head is prevented from quickly returning into the oil pan, and the atomization of oil is promoted since return oil interferes with the balancer shaft and/or oil in the oil pan is easy to be taken up by the counterweights. This leads to an increase in the volume of oil intruding into a ventilation passage of the crank chamber, and if it gets worse, such atomization of oil may lead to a need to increase the capacity of an oil separator chamber.

SUMMARY OF THE INVENTION

The present invention was made with a view to solving the problem inherent in the related art, and an object thereof is to provide a balancer shaft device for a four-cycle V-type eight cylinder engine for a mass-production vehicle constructed and an oil return passage for the engine such that firstly a reduction in productivity can be restrained as much as possible, that secondarily a high supporting rigidity for balancer shafts can be secured while restraining the enlargement of the engine and that thirdly the return of oil is not deteriorated while restraining the enlargement of the engine.

With a view to attaining the aforesaid objects, there is provided a balancer device for a four-cycle V-type eight cylinder engine having an included bank angle of 90 degrees, wherein a cylinder block comprises an upper block 1 and a lower block 2 divided from a horizontal plane passing through a center of a crankshaft 7 and bearing holes 27 are provided in the upper and lower blocks, respectively, at positions symmetrical with respect to the dividing plane in such a manner that axes of the bearing holes extend in parallel with the crank shaft, and wherein in order to insert a balancer shaft 16 in the bearing holes from one direction for support on the cylinder block, a diameter of a journal portion 28 of the balancer shaft 16 is made equal to or larger than that of a weight portion W of the balancer shaft 16, the journal portion 28 being located toward a proximal end of the balancer shaft 16 when viewed in a direction in which the balancer shaft 16 is inserted. According to this construction, since the balancer shafts can directly be supported on the bisected cylinder blocks, the enlargement of the engine can be restrained and advantages can be provided in obtaining a high degree of supporting rigidity for the balancer shafts. In addition, since the balancer shafts can easily be assembled to the engine by inserting the balancer shafts thereinto from one of the directions along the crankshaft, whereby the reduction in the productivity of the engine can be restrained.

In addition, bearing holes 27 for balancer shafts 16 may be provided in bearing walls 5 where main bearings 24 are provided on one side of the main bearings so that the balancer shafts 16 are supported in the bearing holes. According to this construction, since the bearing wall where the main bearing is provided is originally highly rigid, the supporting rigidity for the balancer shaft can be largely improved without causing an enlargement of the engine.

Furthermore, the upper and lower blocks may be attached together by tightening bolts B2, B3 provided on both sides of the bearing holes in such a manner as to hold the bearing holes therebetween. According to this construction, since the balancer shafts are clamped together by the bolts at both sides thereof, the supporting rigidity thereof can further be improved.

In addition, with a view to attaining the above object, there is provided an oil return passage for an engine comprising a cylinder block comprising in turn an upper block 1, a lower block 2 and an oil pan 3 adapted to be joined to a lower surface of the lower block 2, the upper and lower blocks 1, 2 being divided from a horizontal plane passing through a center of a crankshaft 7, the oil return passage being formed so as to extend from a joint surface between the upper block 1 and a cylinder head into the oil pan passing through a portion transversely outwardly of a balancer shaft 16a provided in a side wall of the upper block, a joint surface between the upper and lower blocks and a portion transversely inwardly of a balancer shaft provided in a side wall of the lower block. According to this construction, since oil returning from the cylinder head is allowed to directly return to the oil pan through an independent passage which does not pass through the crank chamber and the balancer shaft receiving chambers, the return oil is prevented from interfering with the balancer shaft to thereby constitute a rotational resistance or produce atomized oil, whereby the return oil is allowed to quickly return to the oil pan.

In addition to the above construction, the oil return passage may comprise an inclined passage 43 for establishing a diagonally downward communication from a crank chamber 38 toward a balancer shaft receiving chamber 42 formed in the side walls of the cylinder blocks and a vertical passage 44 for establishing a communication from a bottom of the balancer shaft receiving chamber into the oil pan. According to this construction, oil within the crank shaft chamber is allowed to quickly return to the oil pan.

Further, according to the invention, there is provided an oil return passage for an engine comprising a cylinder block comprising in turn an upper block, a lower block and an oil pan adapted to be joined to a lower surface of the lower block, the upper and lower blocks being divided from a horizontal plane passing through a center of a crankshaft, wherein a baffle 40 is provided for partitioning between the crank chamber formed in the cylinder block and the oil pan, and wherein a hole 45 as cast is formed at a joint portion between the baffle and the lower block which communicates with the oil pan. Due to this construction, oil within the crankshaft chamber is allowed to quickly return to the oil pan through the hole as cast formed in the baffle. In addition, since a host as cast is provided at a joint portion between the baffle and the lower block, an oil return passage can easily be formed.

DETAILED DESCRIPTION OF THE PREFERRED EMBODIMENTS

Referring to one embodiment shown in attached drawings, the present invention will be described in detail below.

Figure 1:
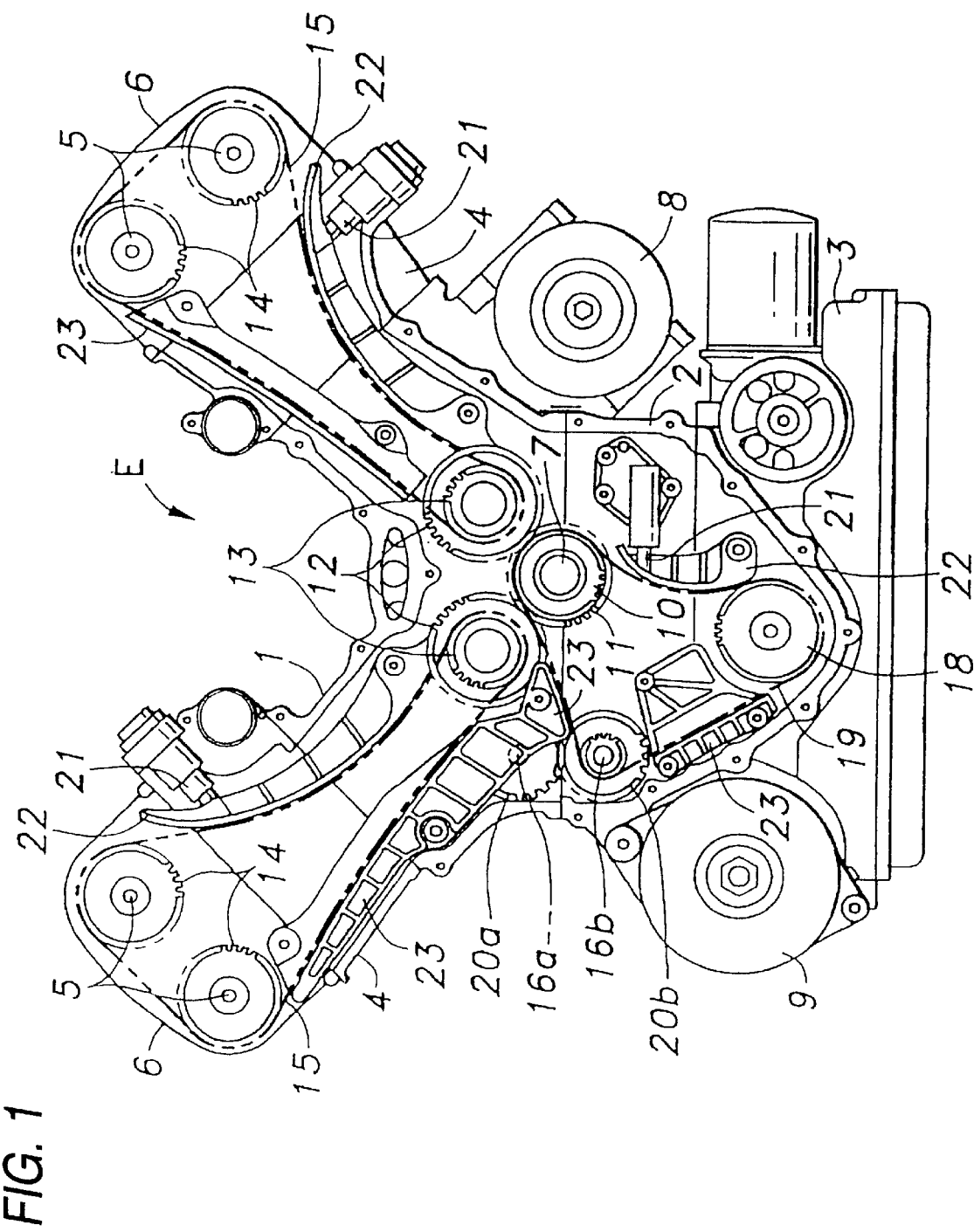
FIG. 1 is an elevation of a V-type engine to which the present invention is applied showing an end of the engine where a crank pulley is provided.

FIG. 1 is an end elevation of a four-cycle V-type eight cylinder engine to which the present invention is applied showing an end of the engine where a crank pulley is provided.

The engine E includes an upper block 1 having in turn a pair of banks of cylinders arranged so as to form an included bank angle of 90 degrees, a lower block 2 joined to a lower surface of the upper block 1, an oil pan 3 joined to a lower surface of the lower block 2 and cylinder heads 4 joined to upper surfaces of the respective banks of cylinders. Two camshafts 5 are provided above the respective cylinder heads 4 and these camshafts 5 are covered with a head cover 6 joined to an upper surface of the respective cylinder heads 4.

As with a well known engine, a crankshaft 7 is supported by main bearings at a joined surface between the upper block 1 and lower block 2.

A compressor 8 for an air conditioner is mounted on the upper block 1 rightward of the crankshaft 7 and an alternator 9 is mounted on the lower block 2 leftward of the crankshaft 7. These compressor 8 and the alternator 9 are interlockingly connected to the crankshaft 7 via a belt/pulley mechanism no shown in the drawing.

A crank sprocket 10 is securely fitted on the crankshaft 7 axially inwardly of the crank pulley and a driver gear 11 is securely fitted on the crankshaft 7 further axially inwardly of the crank sprocket 10.

Two driven gears 12 are provided at positions transversely symmetrical with respect to a vertical plane bisecting the bank included angle and passing through the center of the crankshaft in such a manner so as to be simultaneously brought into mesh engagement with the driver gear 11. A small sprocket 13 is integrally provided on these two driven gears 12, respectively, and a camshaft driving silent chain 15 is provided on each bank of cylinders so as to extend between the small sprocket 13 and sprockets 14 provided on the two camshafts 5 in such a manner as to be wound therearound. Thus, a rotational force generated by the crankshaft 7 is then transmitted to the two camshafts 5 of each bank.

The upper block 1 and lower block 2 are divided by the horizontal plane passing through the center of the crankshaft, and two balancer shafts 16a, 16b are pivotally supported at positions vertically symmetrical with respect to the dividing plane in such a manner that axes thereof extend in parallel with the crankshaft 7.

A balancer shaft sprocket 17 is securely fitted on an axial end of the balancer shaft 16b of those balancer shafts that is supported on the lower block 2 side. A silent chain 19 is provided so as to be wound around this balancer shaft sprocket 17, the crank sprocket 19 and a pump sprocket 18 fixed to the oil pump (not shown) joined to the lower surface of the lower block 2, whereby the lower balancer shaft 16b and the oil pump are constructed so as to rotate together with the crankshaft 7 in an interlocking fashion.

The two balancer shafts 16a, 16b are constructed so as to rotate in directions opposite each other at the same rotational speed through mesh engagement of synchronous gears 20a, 20b securely fitted on the balancer shafts axially inwardly of the balancer shaft sprocket 17 and having the same number of gear teeth.

These two balancer shafts 16a, 16b are disposed on a side the silent chain 19 where the same chain 19 is tensioned relative to the rotational direction of the crankshaft 7. This can minimize the relative phase angle error between the crankshaft 7 and the two balancer shafts 16a, 16b.

A chain tensioner 22 whose pressing force is automatically adjusted by a hydraulic plunger 21 and a run-out prevention chain guide 23 are provided for each of the silent chains 15 wound around the cam sprockets 14 of the camshafts 5 of the two banks of cylinders and the silent chain 19 wound around the balancer shaft sprocket 17 and the pump sprocket 18. These chain tensioners 22 and chain guides 23 are fixed, respectively, to end surfaces of the upper block 1, lower block 2, oil pan 3 and cylinder heads 4 which are located at one end of the engine where the crank pulley is provided at suitable positions thereon by means of bolts or the like.

Figure 2:
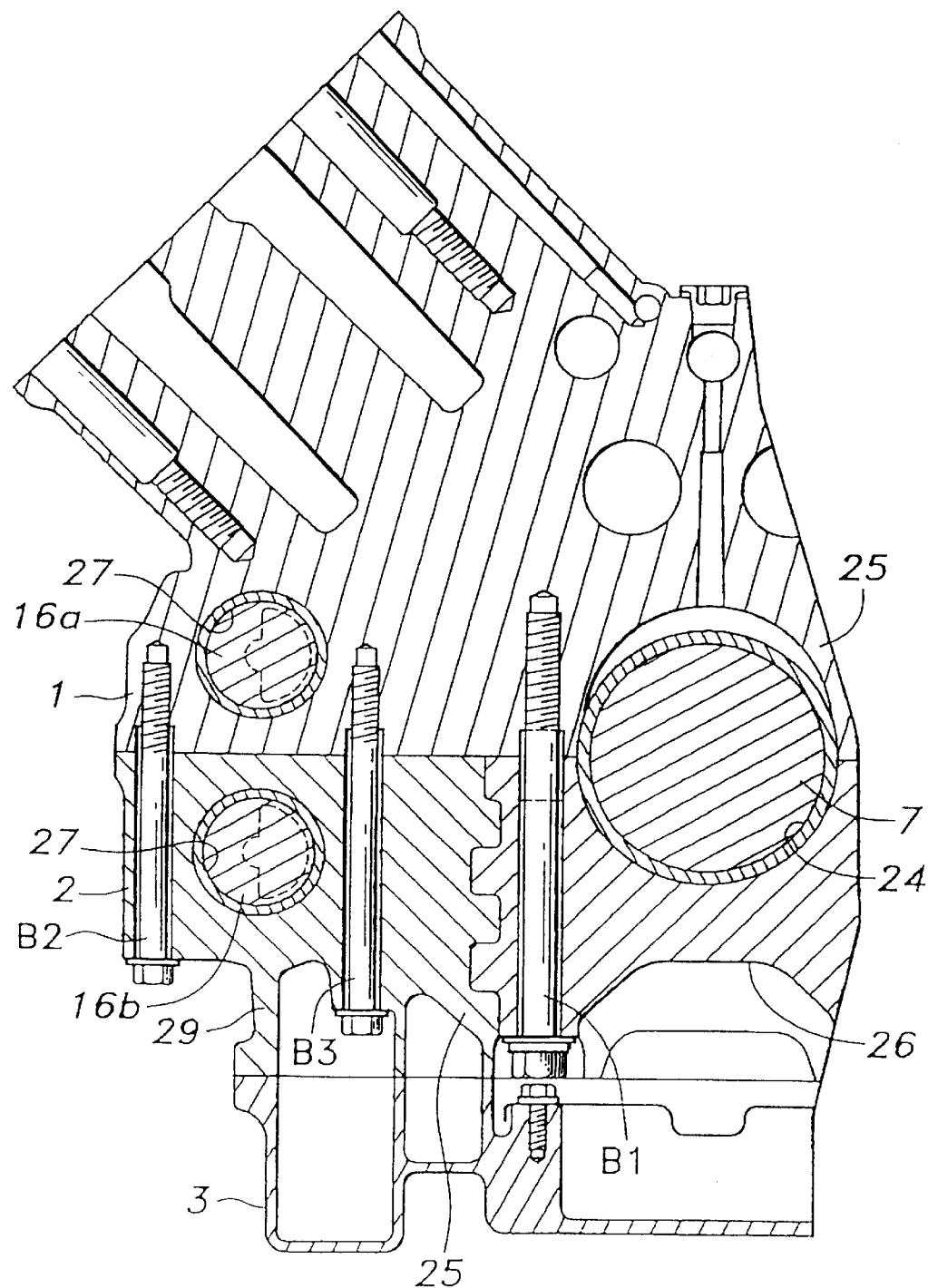
FIG. 2 is a vertical sectional view of a bearing wall showing a part thereof where balancer shaft supporting portions are provided on a side oriented in a direction normal to a crankshaft, as viewed in a direction.

The upper block 1 and the lower block 2 comprises five bearing walls 25, respectively, which are each constructed so as to form a continuous wall surface and provide therein a main bearing 24 as shown in FIG. 2 when the two blocks are joined together. In addition, a bearing cap 26 formed of an iron-system material is cast in the respective bearing walls of the lower block 2 which is cast of an aluminum material, and the upper block 1 and the lower block 2 are clamped together on left and right sides of the main bearings 24 with bolts B1 which are inserted into the bearing caps 26.

Figure 3:
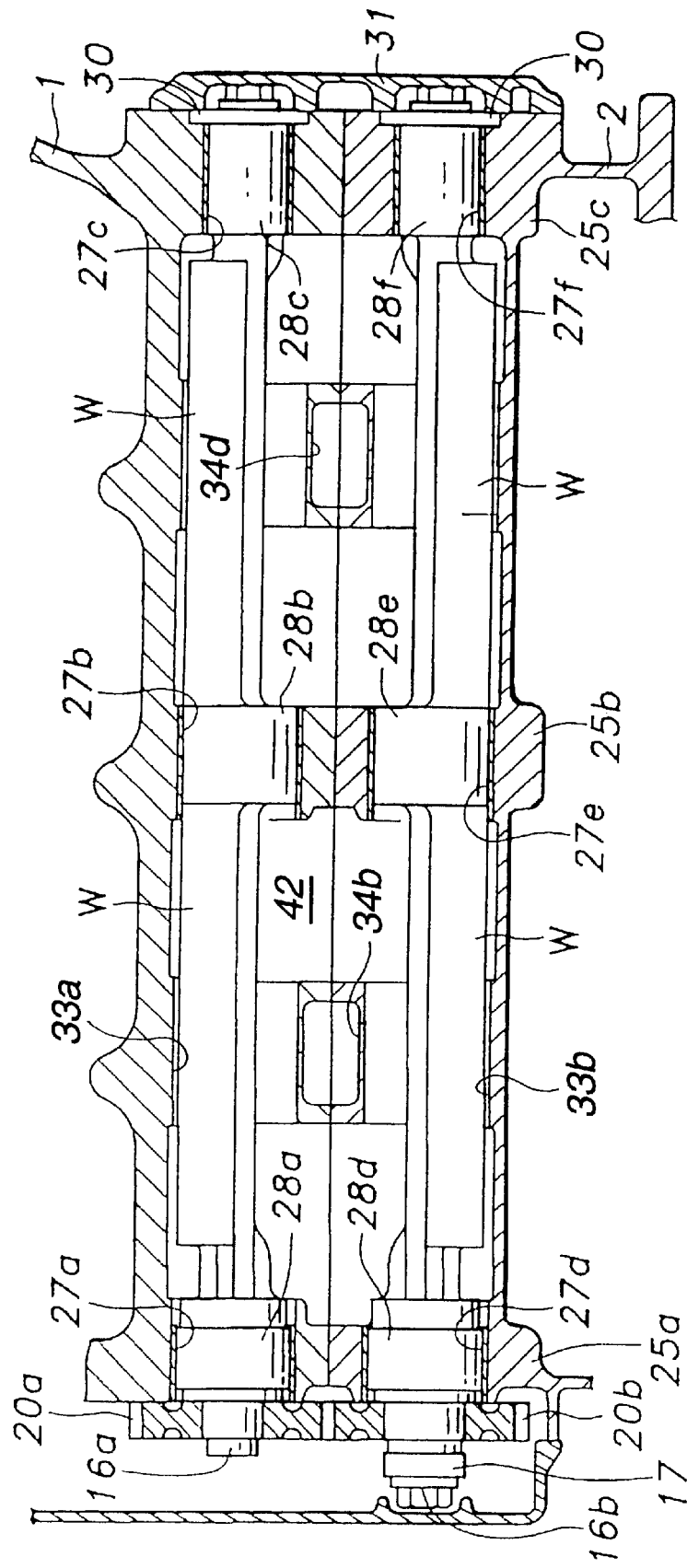
FIG. 3 is a sectional view of main portions of the blancer shaft supporting portions along the axial centers of the balancer shafts as viewed from the right-hand side of FIG. 1.

As shown in FIG. 3, bearing holes 27a, 27b, 27c (27d, 27e, 27f) for supporting each balancer shaft 16a (16b) are formed respectively in three bearing walls 25a, 25b, 25c out of the five bearing walls which are located at an axial end, a central portion and the other axial end of the crankshaft.

Diameters of these bearing holes 27a, 27b, 27c (27d, 27e, 27f) corresponding to each balancer shaft 16a (16b) are determined such that they become larger as they are situated toward the end where the crank pulley is provided. In addition, diameters of respective journal portions 28a, 28b, 28c (28d, 28e, 28f) of each balancer shaft 16a (16b) are determined such that the diameters of the journal portions situated at a central portion and an end of the balancer shaft where the crank pulley is provided become larger than those of respective weight portions W of the balancer shaft, whereby the two balancer shafts 16a (16b) can be inserted from the crank pulley side sequentially into the respective bearing holes 27a, 27b, 27c (27d, 27e, 27f), so that the journal portions 28a, 28b, 28c (28d, 28e, 28f) corresponding to the three bearing holes 27a, 27b, 27c (27d, 27e, 27f) are fitted in those bearing holes.

In a case where the two balancer shafts 16a, 16b are assembled into the engine from a flywheel side (a side opposite to the side where the crank pulley is provided), the diametrical dimensions of the respective bearing holes 27a, 27b, 27c (27d, 27e, 27f) corresponding to each of the balancer shaft 16a (16b) are determined such that the diameters of the bearing holes become larger toward the flywheel side.

In other words, from whichever end of the engine the balancer shafts may be assembled thereinto, if the journal portions 28 situated toward the proximal end of the balancer shaft as viewed in the insertion direction of the balancer shaft is made larger than the diameter of the weight portion W, the respective balancer shafts 16a (16b) can easily be inserted into the respective bearing holes 27a, 27b, 27c (27d, 27e, 27f) for assembly to the cylinder block (the upper block 1 and lower block 2). This provides a high assembling performance.

Pairs of bolts B2, B3 are inserted in the three bearing walls 25a, 25b, 25c of the upper and lower blocks 1, 2 on sides of the respective bearing holes 27a, 27b, 27c, 27d, 27e, 27f in such a manner as to hold each of the bearing holes therebetween from a direction normal to the axes of the two balancer shafts 16a, 16b, whereby the portions of the upper and lower blocks 1, 2 are clamped to each other where the balancer shafts are rotatably supported. Since the respective bearing walls where the main bearings 24 are provided are originally highly rigid, if the supporting portions for the balancer shafts 16a, 16b are provided in those bearing walls, a high supporting rigidity can be obtained. These bolts B2, B3 are set as smaller in diameter and shorter than the clamping bolt B1, whereby the enlargement of the engine E is tried to be restrained.

Since the bearing wall 25 where the main bearing 24 is provided is originally highly rigid, the supporting rigidity for the two balancer shafts 16a, 16b can further be improved if the bearing holes 27a, 27b, 27c, 27d, 27e, 27f for the two balancer shafts 16a, 16b are provided in these bearing wall portions as described above and the upper and lower blocks 1, 2 are clamped together with bolts B2, B3 on the left-hand and right-hand sides of the respective bearing holes 27a, 27b, 27c, 27d, 27e, 27f.

Since a connecting wall 29 constructed so as to be joined to an opening surface of the oil pan 3 at an end face thereof is provided in such a manner as to extend directly below the bearing holes 27d, 27e, 27f for the lower balancer shaft 16b in the lower block 2, whereby the connecting wall 29 plays a role of a rib extending along the axis of the balancer shaft in a lower portion of the lower block 2, the supporting rigidity for the lower balancer shaft 16b can be intended to be further improved.

The two balancer shafts 16a, 16b are positioned in their axial directions by pressingly holding thrust receiving surfaces of thrust plates 30 bolted to an axial end of the respective balancer shafts with a rear cover 31 joined to the end of the upper and lower blocks 1, 2 where the flywheel is provided. In addition, in this embodiment, the synchronous gears 20a, 20b are provided on the crank pulley end of the cylinder block, but they may be provided on the flywheel end of the cylinder block, so that thrust receiving sufraces of the synchronous gears are pressingly held with the rear cover 31.

Figure 4:
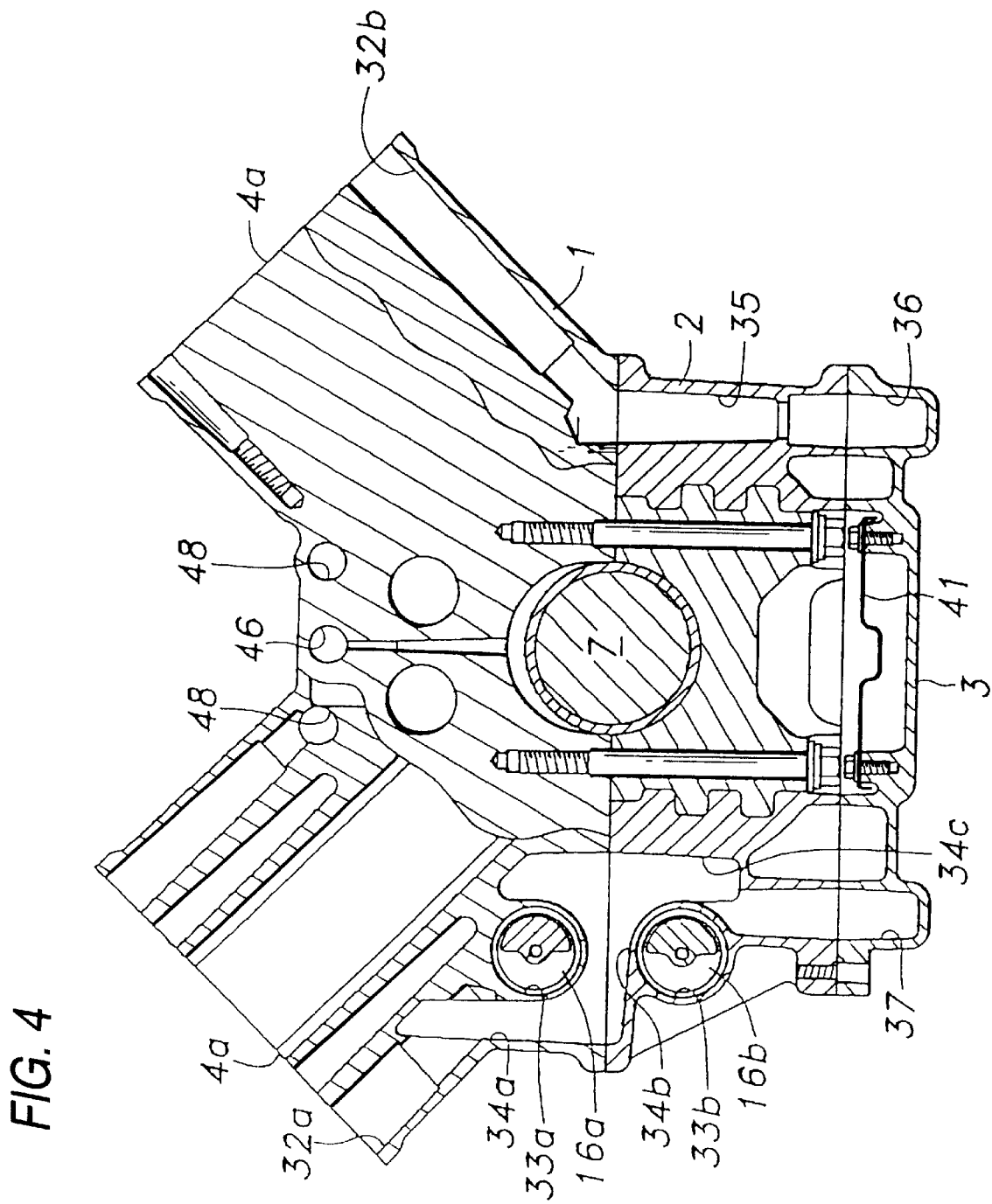
FIG. 4 is a sectional view of a cylinder block of the engine shown in FIG. 1 taken along a portion of an intermediate bearing wall.

As shown in FIG. 4, oil return passages 32a, 32b open, respectively, toward upper surfaces of the cylinder heads 4, in other words, joint surfaces 4a between the cylinder heads 4 and the upper block 1 are formed, respectively, at suitable portions on outermost portions of the respective banks of cylinders in the upper block 1 in such a manner that they become parallel with axes of cylinders in the respective banks. The passage 32a out of those passages which is formed in one of the banks (the left-hand side bank in FIG. 4) is terminated diagonally upwardly of a insertion hole 33a for the upper balancer shaft 16a, and a bottom thereof is caused to communicate with an outer recessed portion 34a formed outwardly of the insertion hole 33a for the upper balancer shaft 16a from the joint surface with the lower block 2 in such a manner as to open upwardly. The oil return passage 32b formed in the other bank of cylinders (the right-hand side bank in FIG. 2) is made to open toward the joint surface with the lower block 2 and is caused to communicate with a vertical hole passage 35 formed vertically through a side wall of the lower block 2 situated on a side opposite to the side where the balancer shaft is provided. This vertical hole passage 35 is made to open toward a right-hand side oil passage 36 formed in a joint surface between the lower block 2 and the oil pan 3 on a right-most portion thereof.

The outer recessed portion 34a formed outwardly of the insertion hole 33a for the upper balancer shaft 16a is continuous with an intermediate recessed portion 34b formed in a position held between the two balancer shafts 16a, 16b on the joint surface between the upper block 1 and the lower block 2, and then with an inner recessed portion 34c formed transversely inwardly of an insertion hole 33b for the lower balancer shaft 16b in the lower block 2 in such a manner as to open downwardly. Then, a bottom-most portion of the inner recessed portion 34c is made to open toward a left-hand side oil flow path 37 formed in the joint surface between the lower block 2 and the oil pan 3 at a left-most portion thereof.

In addition, since the recessed portions 34a, 34c continuously formed on outwardly of the upper balancer shaft 16a and inwardly of the lower balancer shaft 16b are provided at positions where they overlap insertion holes for the pair of bolts B2, B3 for clamping the upper and lower blocks 1, 2 together on the sides of the balancer shafts 16a, 16b in the direction of the crankshaft, there is no further risk of the enlargement of the engine. Furthermore, since the two balancer shafts 16a, 16b are not exposed to the inside of those recessed portions 34a, 34b, 34c, there is no risk of return oil sticking to the balancer shafts 16a, 16b, thereby constituting a rotational resistance.

Figure 5:
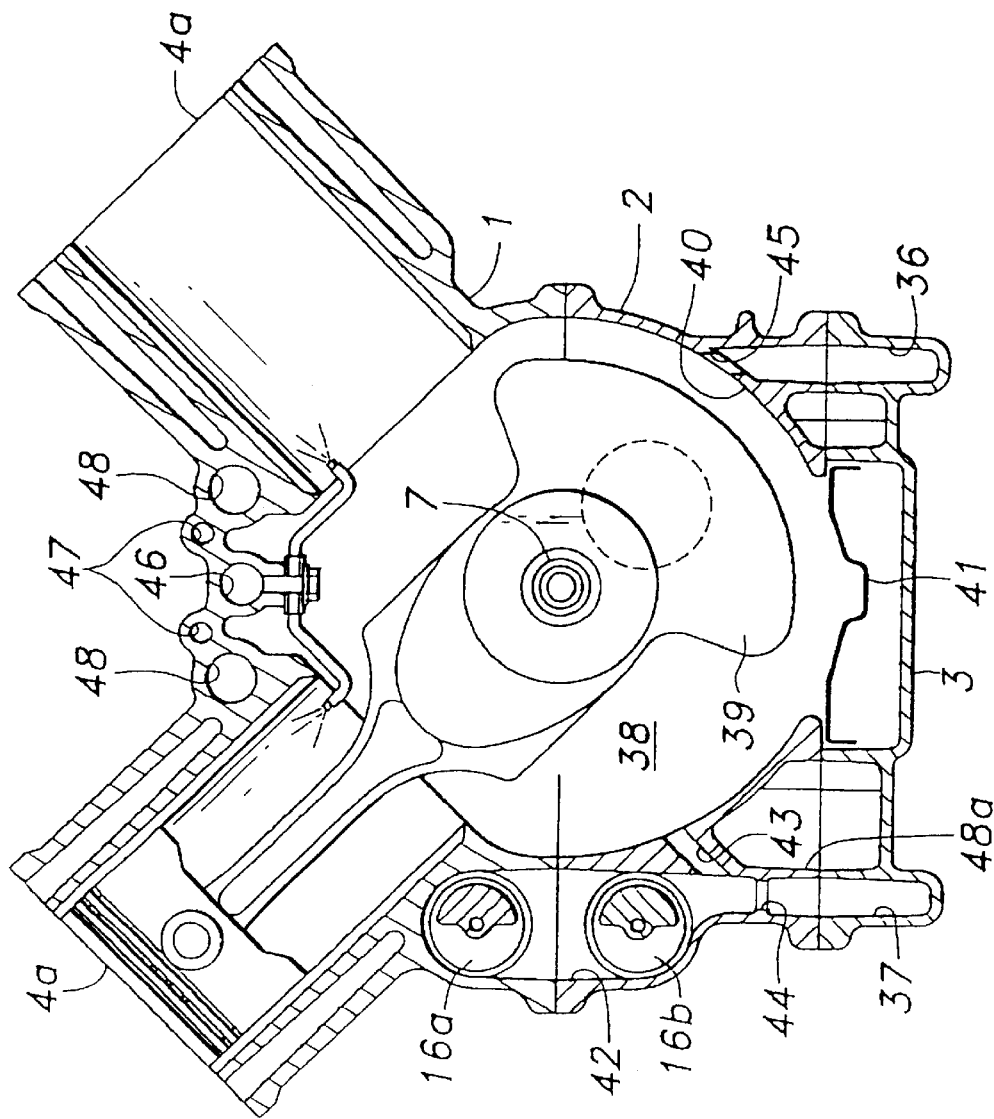
FIG. 5 is a sectional view of the cylinder block of the engine shown in FIG. 1 taken along a portion of a crank chamber.

As shown in FIG. 5, a baffle 40 having an inner circumferential contour conforming to a rotating locus of a counterweight 39 integral with the crankshaft 7 is formed integrally in the lower block 2 so as to constitute a partition between the crank chamber 38 formed in the cylinder block comprising the upper and lower blocks and the oil pan 3. This baffle (partition wall) 40 is made open at a bottom thereof, and the opening so formed is closed with a baffle plate 41 formed of a separate steel plate.

An inclined passage 43 is formed in a portion where the baffle 40 is connected to an inner surface of one of side walls of the lower block 2 in such a manner as to extend diagonally downwardly toward a bottom of the balancer shafts receiving chamber 42. In addition, the balancer shafts receiving chamber 42 is made to open toward the left-side oil path 37 formed in the joint surface between the lower block 2 and the oil pan 3 via a vertical passage 44 suitably formed in the bottom thereof. Since the oil paths (the vertical passage 44 and the oil path 37) communicating with the oil pan 3 below the balancer shafts receiving chamber 42 are caused to communicate with each other, lubricant flowing out of the bearing portions of the balancer shafts 16a, 16b is permitted to return into the oil pan quickly.

A hole as cast 45 is opened in a suitable position of a portion where the baffle 40 is connected to an inner surface of the other side wall of the lower block 2 in such a manner as to extend toward a right-hand side oil path 36 formed in the joint surface between the lower block 2 and the oil pan 3.

Since oil taken up by virtue of rotations of the counterweight 39 of the crankshaft 7 within the crank chamber 38 is permitted to return quickly to the oil pan 3 through these passages 43, 44, 45, even though the baffle plate 41 is provided at the bottom of the crank chamber 38, the return of oil is prevented from being deteriorated. In addition, since the inclined passage 43 is made open to the opening in the bottom of the balancer shafts receiving chamber 42, oil flowing into the balancer shafts receiving chamber 42 does not adhere to the two balancer shafts 16a, 16b, whereby the balancer shafts are prevented from being affected by a rotational resistance or the like.

In addition, formed in a bottom of the two banks of cylinders of the upper block 1 are one oil passage 46, two PCV gas passages 47 and two bleeder passages 48 in such a manner that they extend in parallel with the crankshaft 7. The oil passage 46 is disposed at the center of the bank included angle and the respective PCV gas passages 47 and bleeder passages 48 are disposed outwardly of the oil passage 46 in that order at positions transversely symmetrical with respect to the center of the bank included angle.

Furthermore, a bleeder chamber 48 communicating with the bleeder passages 48 is provided in a space below the baffle and inwardly of the balancer shafts receiving chamber 42, the vertical passage 44 and the oil path 37, and therefore this contributes to making the engine compact. In addition, a part of a plurality of oil return passages comprising the outer recessed portion 34a, the intermediate recessed portion 34b and the inner recessed portion 34c may be constructed so as to constitute a bleeder passage 34d, and in this case, since the bleeder passage 34d is formed independently from the crank chamber 38 and the balancer shafts chamber 42, the atomization of oil can be prevented.

As has been described heretofore, since the balancer shafts are directly supported on the bisected cylinder blocks, the balancer shafts can be provided with high supporting rigidity, while the enlargement of the engine is restrained. In addition, since the balancer shafts can easily be assembled to the cylinder block, the reduction in the productivity of the balancer shaft device can be restrained. Furthermore, since the balancer shafts are constructed so as to be supported on the bearing walls which are originally highly rigid, the construction is highly advantageous in improving the supporting rigidity for the balancer shafts without causing an enlargement of the engine. In addition to the above advantages, the supporting rigidity for the balancer shafts can further be improved if the upper and lower blocks are constructed so as to be clamped together with the bolts on the sides of the balancer shaft.

Moreover, return oil from the cylinder heads is permitted to flow directly into the oil pan without passing through the crank chamber. In addition, oil in the crank shaft is permitted to return to the oil pan quickly through the hole formed in the baffle. Therefore, in any case, since a great amount of oil in the crank chamber can be prevented from being agitated, the aforesaid constructions of the present invention are greatly advantageous in promoting the miniaturization of the V-type engine.

While only certain embodiments of the invention have been specifically described herein, it will apparent that numerous modifications may be made thereto without departing from the spirit and scope of the invention.

The present disclosure relates to the subject matter contained in Japanese Patent Applications No. Hei. 10-345160 filed on Dec. 4, 1998 and No. Hei. 10-372919 filed on Dec. 28, 1998 which are expressly incorporated herein by reference in its entirety.

What is claimed is:

1. A balancer device for a four-cycle V-type eight cylinder engine having an included bank angle of 90 degrees, comprising:

a crankshaft;

a cylinder block having an upper block and a lower block divided by a horizontal plane passing through a center of said crankshaft, each of said upper and lower blocks defining a bearing hole in such a manner that an axis thereof extends in parallel with said crankshaft, said bearing holes of said upper and lower blocks being located at positions symmetrical with respect to the dividing plane; and balancer shafts supported in said bearing holes and having gears intermeshed with each other, wherein said two balance shafts are supported in said bearing holes such that respective both ends thereof and respective intermediate portions thereof are disposed at the same positions of said bearing holes in a direction of said crankshaft.

2. A balancer device for a four-cycle V-type eight cylinder engine as set forth in claim 1, wherein said upper and lower blocks are attached together by tightening bolts provided on both sides of said bearing holes in such a manner as to hold said bearing holes therebetween.

3. A balancer device for a four-cycle V-type eight cylinder engine as set forth in claim 2, wherein said bolts are smaller in diameter than bolts for clamping bearing caps.

4. A balancer device for a four-cycle V-type eight cylinder engine as set forth in claim 3, wherein said bolts are shorter than said bolts for clamping bearing caps.

5. A balancer device for a four-cycle V-type eight cylinder engine as set forth in claim 2, wherein said bolts are shorter than bolts for clamping bearing caps.

6. A balancer device for a four-cycle V-type eight cylinder engine as set forth in claim 2, comprising:

an oil pan joined to a lower surface of said lower block, wherein an oil return passage being formed so as to extend from a joint surface of said upper block with a cylinder head into said oil pan passing through a portion transversely outwardly of said balancer shaft provided in a side wall of said upper block, a joint surface between said upper and lower blocks and a portion transversely inwardly of said balancer shaft provided in a side wall of said lower block.

7. A balancer device for a four-cycle V-type eight cylinder engine as set forth in claim 1, wherein a connecting wall which is joined to said oil pan at an end face thereof is provided directly below said bearing holes of said lower blancer shaft in said lower block.

8. A balancer device for a four-cycle V-type eight cylinder engine as set forth in claim 7, wherein said upper and lower blocks are attached together by tightening bolts provided on both sides of said bearing holes in such a manner as to hold said bearing holes therebetween.

9. A balancer device for a four-cycle V-type eight cylinder engine as set forth in claim 1, comprising:

an oil pan joined to a lower surface of said lower block, wherein an oil return passage being formed so as to extend from a joint surface of said upper block with a cylinder head into said oil pan passing through a portion transversely outwardly of said balancer shaft provided in a side wall of said upper block, a joint surface between said upper and lower blocks and a portion transversely inwardly of said balancer shaft provided in a side wall of said lower block.

10. A balancer device for a four-cycle V-type engine cylinder engine as set forth in claim 1, further comprising:

an oil pan joined to a lower surface of said lower block so as to form an oil return passage between said oil pan and said cylinder block, wherein a baffle is provided for forming a partition between a crank chamber formed in said cylinder block and said oil pan, and a hole as cast communicating with said oil pan is formed in a portion where said baffle is connected to said lower block.

11. A balancer device for a four-cycle V-type eight cylinder engine having a bank included angle of 90 degrees, comprising:

a crankshaft;

a cylinder block having an upper block and a lower block divided by a horizontal plane passing through a center of said crankshaft, each of said upper and lower blocks defining a bearing hole in such a manner that an axis thereof extends in parallel with said crankshaft, said bearing holes of said upper and lower blocks being located at positions symmetrical with respect to the dividing plane; and balancer shafts supported in said cylinder block by inserting in said bearing holes from one direction, said balancer shafts having gears intermeshed with each other, said balancer shaft comprising a journal portion and a weight portion, a diameter of said journal portion located in a proximal end of said balancer shaft when viewed in a direction in which said balancer shaft is inserted being equal to or larger than that of said weight portion, wherein said two balance shafts are supported in said bearing holes such that respective both ends thereof and respective intermediate portions thereof are disposed at the same positions of said bearing holes in a direction of said crankshaft.

12. A balancer device for a four-cycle V-type eight cylinder engine as set forth in claim 11, wherein said upper and lower blocks are attached together by tightening bolts provided on both sides of said bearing holes in such a manner as to hold said bearing holes therebetween.

13. A balancer device for a four-cycle V-type eight cylinder engine as set forth in claim 12, wherein said bolts are smaller in diameter than bolts for clamping bearing caps.

14. A balancer device for a four-cycle V-type eight cylinder engine as set forth in claim 13, wherein said bolts are shorter than said bolts for clamping bearing caps.

15. A balancer device for a four-cycle V-type eight cylinder engine as set forth in claim 12, wherein said bolts are shorter than bolts for clamping bearing caps.

16. A balancer device for a four-cycle V-type eight cylinder engine as set forth in claim 12, wherein said upper and lower blocks are attached together by tightening bolts provided on both sides of said bearing holes in such a manner as to hold said bearing holes therebetween.

17. A balancer device for a four-cycle V-type eight cylinder engine as set forth in claim 12, comprising:

an oil pan joined to a lower surface of said lower block, wherein an oil return passage being formed so as to extend from a joint surface of said upper block with a cylinder head into said oil pan passing through a portion transversely outwardly of said balancer shaft provided in a side wall of said upper block, a joint surface between said upper and lower blocks and a portion transversely inwardly of said balancer shaft provided in a side wall of said lower block.

18. A balancer device for a four-cycle V-type eight cylinder engine as set forth in claim 11, wherein a connecting wall which is joined to said oil pan at an end face thereof is provided directly below said bearing holes of said lower blancer shaft in said lower block.

19. A balancer device for a four-cycle V-type eight cylinder engine as set forth in claim 11, comprising:

an oil pan joined to a lower surface of said lower block, wherein an oil return passage being formed so as to extend from a joint surface of said upper block with a cylinder head into said oil pan passing through a portion transversely outwardly of said balancer shaft provided in a side wall of said upper block, a joint surface between said upper and lower blocks and a portion transversely inwardly of said balancer shaft provided in a side wall of said lower block.

20. A balancer device for a four-cycle V-type eight cylinder engine as set forth in claim 11, further comprising:
an oil pan joined to a lower surface of said lower block so as to form an oil return passage between said oil pan and said cylinder block,
wherein a baffle is provided for forming, a partition between a crank chamber formed in said cylinder block and said oil pan, and
a hole as cast communicating with said oil pan is formed in a portion where said baffle is connected to said lower block.

21. A balancer device for a four-cycle V-type eight cylinder engine having a bank included angle of 90 degrees, comprising:
a crankshaft;
a cylinder block having an upper block and a lower block divided by a horizontal plane passing through a center of said crankshaft, each of said upper and lower blocks defining a bearing wall for supporting a main bearing and a bearing hole provided in said bearing wall in such a manner that an axis thereof extends in parallel with said crankshaft, said bearing holes of said upper and lower blocks being located at positions symmetrical with respect to the dividing plane and on one side of said main bearing; and
balancer shafts supported in said bearing holes and having gears intermeshed with each other,
wherein said two balance shafts are supported in said bearing, holes such that respective both ends thereof and respective intermediate portions thereof are disposed at the same positions of said bearing holes in a direction of said crankshaft.

22. A balancer device for a four-cycle V-type eight cylinder engine as set forth in claim 21, wherein said upper and lower blocks are attached together by tightening bolts provided on both sides of said bearing holes in such a manner as to hold said bearing holes therebetween.

23. A balancer device for a four-cycle V-type eight cylinder engine as set forth in claim 22, wherein said bolts are smaller in diameter than bolts for clamping bearing caps.

24. A balancer device for a four-cycle V-type eight cylinder engine as set forth in claim 23, wherein said bolts are shorter than said bolts for clamping bearing caps.

25. A balancer device for a four-cycle V-type eight cylinder engine as set forth in claim 22, wherein said bolts are shorter than bolts for clamping bearing caps.

26. A balancer device for a four-cycle V-type eight cylinder engine as set forth in claim 22, comprising:
an oil pan joined to a lower surface of said lower block, wherein an oil return passage being formed so as to extend from a joint surface of said upper block with a cylinder head into said oil pan passing through a portion transversely outwardly of said balancer shaft provided in a side wall of said upper block, a joint surface between said upper and lower blocks and a portion transversely inwardly of said balancer shaft provided in a side wall of said lower block.

27. A balancer device for a four-cycle V-type eight cylinder engine as set forth in claim 21, wherein a connecting wall which is joined to said oil pan at an end face thereof is provided directly below said bearing holes of said lower blancer shaft in said lower block.

28. A balancer device for a four-cycle V-type eight cylinder engine as set forth in claim 27, wherein said upper and lower blocks are attached together by tightening bolts provided on both sides of said bearing holes in such a manner as to hold said bearing holes therebetween.

29. A balancer device for a four-cycle V-type eight cylinder engine as set forth in claim 21, comprising:
an oil pan joined to a lower surface of said lower block, wherein an oil return passage being formed so as to extend from a joint surface of said upper block with a cylinder head into said oil pan passing through a portion transversely outwardly of said balancer shaft provided in a side wall of said upper block, a joint surface between said upper and lower blocks and a portion transversely inwardly of said balancer shaft provided in a side wall of said lower block.

30. A balancer device for a four-cycle V-type eight cylinder engine as set forth in claim 21, further comprising:
an oil pan joined to a lower surface of said lower block so as to form an oil return passage between said oil pan and said cylinder block,
wherein a baffle is provided for forming a partition between a crank chamber formed in said cylinder block and said oil pan, and
a hole as cast communicating with said oil pan is formed in a portion where said baffle is connected to said lower block.

31. A balancer device for a four-cycle V-type eight cylinder engine having an included bank angle of 90 degrees, comprising:
a crankshaft;
a cylinder block having an upper block and a lower block divided by a horizontal plane passing through a center of said crankshaft, each of said upper and lower blocks defining a bearing hole in such a manner that an axis thereof extends in parallel with said crankshaft, said bearing holes of said upper and lower blocks being located at positions symmetrical with respect to the dividing plane;
balancer shafts supported in said bearing holes and having gears intermeshed with each other; and
an oil pan joined to a lower surface of said lower block, wherein an oil return passage being formed so as to extend from a joint surface of said upper block with a cylinder head into said oil pan passing through a portion transversely outwardly of said balancer shaft provided in a side wall of said upper block, a joint surface between said upper and lower blocks and a portion transversely inwardly of said balancer shift provided in a side wall of said lower block,
wherein said oil return passage comprises an inclined passage for establishing a diagonally downward communication from a crank chamber formed in said cylinder block toward a balancer shaft receiving chamber formed in said side walls of said cylinder blocks and a vertical passage for establishing a communication from a bottom of said balancer shaft receiving chamber into said oil pan.

32. A balancer device for a four-cycle V-type eight cylinder engine having an included bank angle of 90 degrees, comprising:
a crankshaft;
a cylinder block having an upper block and a lower block divided by a horizontal plane passing through a center of said crankshaft, each of said upper and lower blocks defining a bearing hole in such a manner that an axis thereof extends in parallel with said crankshaft, said bearing holes of said upper and lower blocks being located at positions symmetrical with respect to the dividing plane;

balancer shafts supported in said bearing holes and having gears intermeshed with each other; and an oil pan joined to a lower surface of said lower block, wherein an oil return passage being formed so as to extend from a joint surface of said upper block with a cylinder head into said oil pan passing through a portion transversely outwardly of said balancer shaft provided in a side wall of said upper block, a joint surface between said upper and lower blocks and a portion transversely inwardly of said balancer shaft provided in a side wall of said lower block, wherein said oil return passage comprises an inclined passage for establishing a diagonally downward communication from a crank chamber formed in said cylinder block toward a balancer shaft receiving chamber formed in said side walls of said cylinder blocks and a vertical passage for establishing a communication from a bottom of said balancer shaft receiving chamber into said oil pan.

33. A balancer device for a four-cycle V-type eight cylinder engine having an included bank angle of 90 degrees, comprising:

a crankshaft;

a cylinder block having an upper block and a lower block divided by a horizontal plane passing through a center of said crankshaft, each of said upper and lower blocks defining a bearing hole in such a manner that an axis thereof extends in parallel with said crankshaft, said bearing holes of said upper and lower blocks being located at positions symmetrical with respect to the dividing plane;

balancer shafts supported in said bearing holes and having gears intermeshed with each other; and an oil pan joined to a lower surface of said lower block, wherein an oil return passage being formed so as to extend from a joint surface of said upper block with a cylinder head into said oil pan passing through a portion transversely outwardly of said balancer shaft provided in a side wall of said upper block, a joint surface between said upper and lower blocks and a portion transversely inwardly of said balancer shaft provided in a side wall of said lower block, wherein said oil return passage comprises an inclined passage for establishing a diagonally downward communication from a crank chamber formed in said cylinder block toward a balancer shaft receiving chamber formed in said side walls of said cylinder blocks and a vertical passage for establishing a communication from a bottom of said balancer shaft receiving chamber into said oil pan.

34. A balancer device for a four-cycle V-type eight cylinder engine having an included bank angle of 90 degrees, comprising:

a crankshaft;

a cylinder block having an upper block and a lower block divided by a horizontal plane passing through a center of said crankshaft, each of said upper and lower blocks defining a bearing hole in such a manner that an axis thereof extends in parallel with said crankshaft, said bearing holes of said upper and lower blocks being located at positions symmetrical with respect to the divisional plane and on one side of said main bearing;

balancer shafts supported in said cylinder block by inserting in said bearing holes from one direction, said balancer shafts having gears intermeshed with each other, said balancer shaft comprising a journal portion and a weight portion, a diameter of said journal portion located in a proximal and of said balancer shaft when viewed in a direction in which said balancer shaft is inserted being equal to or greater than that of said weight portion; and an oil pan joined to a lower surface of said lower block, wherein said upper and lower blocks are attached together by tightening bolts provided on both sides of said bearing holes in such a manner as to hold said bearing holes therebetween, and an oil pan joined to a lower surface of said lower block, wherein an oil return passage is formed so as to extend from a joint surface of said upper bock with a cylinder head into said oil pan passage through a portion transversely outwardly of said balancer shaft provided in a side wall of said upper block, a joint surface between said upper and lower blocks and a portion transversely inwardly of said balancer shaft provided in a side wall of said lower block.

35. A balancer device for a four-cycle V-type eight cylinder engine as set froth in claim 34, wherein said oil return passage comprises an inclined passage for establishing a diagonally downward communication from a crank chamber formed in said cylinder block toward a balancer shaft receiving chamber formed in said side walls of said cylinder blocks and a vertical passage for establishing a communication from a bottom of said balancer shaft receiving chamber into said oil pan.

36. A balancer device for a four-cycle V-type eight cylinder engine having an included bank angle of 90 degrees, comprising:

a crankshaft;

a cylinder block having an upper block and a lower block divided by a horizontal plane passing through a center of said crankshaft, each of said upper and lower blocks defining a bearing hole in such a manner that an axis thereof extends in parallel with said crankshaft, said bearing holes of said upper and lower blocks being located at positions symmetrical with respect to the divisional plane and on one side of said main bearing;

balancer shaft s supported in said cylinder block by inserting in said be a ring holes from one direction, said balancer shafts having gears intermeshed with each other, said balancer shaft comprising a journal portion and a weight portion, a diameter of said journal portion located in a proximal and of said balancer shaft when viewed in a direction in which said balancer shaft is inserted being equal to or greater than that of said weight portion; and an oil pan joined to a lower surface of said lower block so as to form oil return passage between said oil pan and said cylinder block, wherein said upper and lower blocks are attached together by tightening bolts provided on both sides of said bearing holes in such a manner as to hold said bearing holes therebetween, wherein a baffle is provided for forming a partition between a crank chamber formed in said cylinder block and said oil pan, and a hole as cast communicating with said oil pan is formed in a portion where said baffle is connected to said lower block.

37. A balancer device for a four-cycle V-type eight cylinder engine having an included bank angle of 90 degrees, comprising:

a crankshaft;

a cylinder block having an upper block and a lower block divided by a horizontal plane passing through a center of said crankshaft, each of said upper and lower blocks defining a bearing hole in such a manner that an axis thereof extends in parallel with said crankshaft, said bearing holes of said upper and lower blocks being located at positions symmetrical with respect to the divisional plane and on one side of said main bearing; and balancer shafts supported in said cylinder block by inserting in said bearing holes from one direction, said balancer shafts having gears intermeshed with each other, said balancer shaft comprising a journal portion and a weight portion, a diameter of said journal portion located in a proximal and of said balancer shaft when viewed in a direction in which said balancer shaft is inserted being equal to or greater than that of said weight portion, wherein said upper and lower blocks are attached together by tightening bolts provided on both sides of said bearing holes in such a manner as to hold said bearing holes therebetween, and wherein said two balance shafts are supported in said bearing holes such that respective both ends thereof and respective intermediate portions thereof are disposed at the same positions of said bearing holes in a direction of said crankshaft.

* * * * *